United States Patent Office

3,493,501
Patented Feb. 3, 1970

3,493,501
METHOD FOR THE REMOVAL OF SUSPENDED MATTER IN WASTE WATER TREATMENT
John C. Eck, Convent, N.J., assignor to Allied Chemical Corporation, New York, N.Y., a corporation of New York
No Drawing. Filed June 15, 1967, Ser. No. 646,188
Int. Cl. C02b 1/20
U.S. Cl. 210—54                                14 Claims

ABSTRACT OF THE DISCLOSURE

A synthetic cationic or anionic organic latex is exceedingly effective at flocculating suspended organic or inorganic matter in water whereby it is readily separated from the water. These latices are water-based emulsions formed by the free radical induced emulsion polymerization of olefins or dienes in the presence of water and a cationic or anionic organic emulsifying agent.

FIELD OF THE INVENTION

This invention relates to a process for the purification and clarification of water. More particularly, this invention relates to a process for removing contaminating insoluble suspended matter from turbid water by flocculation. Still more particularly, it relates to the use of an anionic or cationic synthetic organic latex to flocculate and produce settling of finely divided organic and inorganic solids suspended in water in preparation for the use or reuse of said water or its discharge to receiving surface waters.

DESCRIPTION OF THE PRIOR ART

Water used in such industrial operations as papermaking, petroleum refining, secondary recovery of petroleum by water flooding, hydroelectric plants, atomic energy operations, metal plating, boiler plants and the like, must be relatively free of suspended matter. Clarification of naturally occurring water is necessary before use in operations of this type in many instances. Additionally, one of the most difficult industrial problems is the clarification, prior to discharge, of industrial waste water which would otherwise create a nuisance and cause pollution of lands and streams. Examples of such waste waters are sulfate mine waters, coal washing waters, paper or pulp waste waters, clay suspensions, calcium carbonate suspensions and other suspensions of finely divided solids in water which result from industrial processes such as mining, washing and the like. Such suspensions will frequently remain stable for many days. If the solids are allowed to remain in suspension, the water cannot be utilized for industrial processes and also presents a disposal problem. Likewise, in the treatment of municipal sewage, it is necessary that suspended particles be removed.

The expeditious and effective removal of suspended organic and inorganic material from water thus forms an essential step in many plant operations. New and improved processes for water renovation, particularly removal of insoluble suspended matter, are, therefore, needed.

Various methods are currently used for the removal of insoluble contaminants for water, and in these methods flocculation procedures are rather extensively employed. As used herein, the terms flocculating angent, coagulating agent, flocculant and coagulant are synonymous, likewise the terms flocculation and coagulation.

Flocculation procedures depend upon the use of compounds known as coagulants or flocculants, to remove suspended matter from contaminated water by the formation of a floc comprising the flocculant and the suspended matter. The water containing the floc may then be passed through flocculators to enlarge the floc and then into settling basins where most of the flocculated suspended matter can be separated from the water by decantation or filtration.

The desired goal in a flocculation procedure is to obtain the maximum degree of removal of suspended matter with the minimum expenditure of money for coagulants and treatment facilities. It is, therefore, desirable that the flocculant be effective for the removal of the suspended matter with the use of a minimum amount thereof. It is also desirable that the floc settle relatively rapidly and that the floc be relatively tough in order that it will not break up or disintegrate while the water containing it is being conveyed to a settling basin, filter bed or other separation means.

Alum and iron salts are currently used extensively in clarifying raw and waste water supplies of many types, particularly in municipal water clarification and in the clarification of water supplies used in industrial processes. Quite frequently it is necessary to use extremely large dosages of alum or iron salts to clarify such waters.

Serious investigators of the mechanism by which alum coagulates suspended matter in water have determined that the alum functions in a dual role insofar as it must first neutralize the charges associated with the surface of the suspended particles, which charges tend to keep these particles in suspension. Once the particle charges have been neutralized, which point is generally called the isoelectric point, it has been postulated that additional amounts of alum are necessary to provide a voluminous, sticky surface on which to absorb the neutralized particles and produce a floc with sufficient density to settle rapidly. Thus, in some cases, it is necessary to use as much as 500 p.p.m. of alum to effectively coagulate a turbid water, with the larger part of the alum acting in the function of a binder or a coalescer for the neutralized particles. When such large quantities of alum are used to coagulate the suspended matter in such waters, undesirable decreases in pH's sometimes occur, and the cost of treatment becomes excessive.

The need for flocculating agents which would not cause this pH decrease has long been realized. Natural organic substances such as animal glues, vegetable gums and starches have been employed with moderate success. The limited pH range in which such agents may be effectively used, the criticality of the amounts that may be added to the suspensions, difficulties encountered in storage due to spoilage, and the accompanying variations from specifications due to changes during storage are definite disadvantages to their use and prevent their wide acceptance.

Within recent years numerous publications and patents have appeared containing teachings to the effect that suspensions of organic solids such as sewage can be flocculated and settled to effect clarification thereof through the use of appropriate synthetic organic cationic or anionic polymer resins. While good results have been achieved in a few instances, the polymer promoted flocculation process, as presently practiced, are usually uneconomical for large scale clarification operations such as those required for most municipal and industrial waste streams.

Additional disadvantages of current processes of chemical treatment of water containing suspended organic or inorganic matter include: (1) slowness of removal of coagulant flocs from the treated water with a consequent need for costly large size treating and settling tanks; (2) inefficiency in the removal of very finely divided suspended matter; (3) relatively low purity of treated water; and (4) relatively high volume of sludge produced per unit volume of water treated.

Generally, suspensions comprise negatively charged particles and, thus, the flocculants most often used are cationic in nature. However, much of the coagulant may not be effective as such since it is used up in charge neutralization. Even in the chemical coagulation of solids in raw water supplies, wherein the content of suspended solids is generally only a few parts per million, acceptable clarification has hitherto been achieved only by using relatively large and expensive treating equipment and excessively large amounts of chemical coagulant per unit amount of solids removed.

It may be said, therefore, that to date no really satisfactory chemical clarifying agent or chemical process for removing suspended organic or inorganic matter from aqueous liquors at acceptable cost has been developed. It would, thus, be desirable to provide an efficient flocculation process whereby more complete and rapid separation of disperse organic and inorganic solids from aqueous media is achieved with an organic polymeric flocculant.

Our invention, as described and disclosed herein, provides means for overcoming the major disadvantages of the methods of chemical treatment as practiced in the prior art, and makes chemical treatment suitable and economical for treatment of municipal sewages, effluents from septic tanks, cesspools and other individual waste sources, industrial waste waters, raw water supplies and the like.

SUMMARY OF THE INVENTION

It is an object of the invention to provide an economical process for removing from raw water used for municipal or industrial purposes and from sewage and industrial waste water a portion of the suspended and settleable solids contained therein.

It is a further object of this invention to provide a novel type of clarifying agent for the treatment of sewage, which type of clarifying agent causes rapid flocculation and sedimentation of the suspended solids in said sewage, and thereby makes said solids adapted for easy and rapid removal at low cost, in treating mechanisms of simple design and modest size.

It is a still further object of this invention to provide a novel process for the treatment of sewage, wherein there is produced a treated water of relatively high degree of purity from aqueous liquors containing wastes, such as fecal matter or other contaminants, in treating mechanisms of simple and modest size.

Another object is to provide a sewage sludge of relatively higher solids content, and of relatively lower volume per unit volume of sewage treated, than is obtained in present conventionally used chemical methods of treating sewage.

Another object is to provide a sludge of modified characteristics (e.g. dewatering, filtration, dispersion and digestion characteristics), as compared to the sludge obtained with conventional chemical methods of treating sewage or such like liquors.

Another object of the present invention is to provide a new and improved method for coagulating and producing settling of finely divided, predominantly inorganic solids from relatively dilute suspensions thereof in water.

Another object of the invention is to provide a process for treating inorganic aqueous suspensions in which a relatively small amount of added substance will produce a uniform floc and settling of the finely divided suspended solids without introducing into the water substances which have a harmful effect on industrial processes or cause harmful pollution of streams.

Another object is to provide a treatment which will produce a clear supernatant liquid substantially free of residual finely divided suspended impurities.

Another object of this invention is to provide a method for clarifying and substantially purifying water supplies wherein maximum effectiveness is achieved as to the elimination of turbidity.

Another object of this invention is to provide a practical means for purifying contaminated water sources to render them potable.

Further objects and advantages will become apparent from the description of the invention which follows in greater detail.

These and other objects are accomplished in accordance with this invention wherein water containing suspended matter is treated with a synthetic organic cationic or anionic latex flocculating agent. The latices of this invention are found to promote the flocculation of the suspended matter whereby it is readily separated from the water by conventional means.

Various advantages accrue from the use of an anionic or cationic latex as a flocculant in the clarification of water. One of the foremost advantages is the production of a floc which settles faster. This advantage is particularly important since it makes it possible either to increase the amount of contaminated water undergoing treatment or to treat a given quantity of water in a shorter period of time when a latex coagulant is used as herein described, and thus, the economy of the clarification operation is greatly improved. Also, the use of the latex coagulant results in the production of a tougher, relatively difficulty disintegrated floc. This advantage is of imporance when the water containing the floc is conveyed to a filter or other separation means. The floc tends to remain in an integrated form, and as such it is readily separated from the water. Also, it is possible to employ a lesser amount of the latex coagulant than of an inorganic coagulant to effect the equivalent degree of clarification of the water. This advantage makes use of the latex economically desirable. It is also obvious that by the use of an organic rather than an inorganic coagulant, the content of dissolved solids and the conductivity of the treated water are reduced, making the water of better quality for numerous commercial uses. With some water use of the latex improves the taste of the treated water, reducing or eliminating its astringent quality.

The decision as to whether to use an anionic or cationic latex to flocculate the suspended matter in the water being treated depends on the nature and concentration of the suspended matter. Most suspensions are at least partly colloided in nature and, hence, are negatively charged.

With predominantly inorganic suspensions, the most effective latex is usually cationic. With a predominantly organic suspension, unless it is extremely diffuse, a cationic latex is normally less efficient than an anionic one in that too much of it must be utilized solely to effect charge neutralization. A much lower concentration of an anionic latex will remove a considerable portion of the suspended organic matter. If a greater degree of purification is desired, some of the suspended organic matter may first be precipitated by an anionic latex and a further final clarification of the treated water than effectuated with a cationic latex.

The process of the present invention may be successfully used concomitantly with various standard methods of sewage or industrial waste water treatment in which a digestion, settling or filtration step or combination thereof is used.

In carrying out the process of our invention, the latex flocculant is added to the aqueous suspension, preferably with agitation whereby a uniform distribution of the latex flocculating agent throughout the suspension is accomplished quickly but without such turbulent agitation as to degrade any flocs building up immediately upon the addition of the flocculant.

Length of the period of agitation is dependent upon several variables, such as the design of the equipment, the clarification desired, the coagulant employed, the amount of coagulant used and the like. The preferred period varies from 10 to 60 minutes, but in some instances the desired degree of clarification can be obtained by agitating the mixture for a period of less than 10 minutes.

After the period of agitation the latex-treated suspension is allowed to stand either quiescent or with very mild agitation for a period sufficiently long to permit concentration of the floc into a substratum. Standing for from 2 to 30 minutes is ordinarily sufficient. The floc may then be separated from the aqueous dispersing medium by any convenient separatory technique. Such a technique can involve one or a combination of operations such as sedimentation, decantation, filtration, centrifugation and flotation.

The aqueous suspensions of organic or inorganic solids suitable for processing in accordance with the invention can vary in solids content over a wide range. Illustratively, a raw sewage stream may typically contain an amount of suspended predominntly organic solids within the range of from as little as 50 parts up to 1000 parts per million parts by weight of the stream. However, water containing up to 20,000 or more p.p.m. of suspended organic or inorganic matter may suitably be treated according to this invention.

The optimum dosage of latex coagulant for any particular aqueous suspension to be treated is distinctly an individual problem and can be best determined by actual tests (see Babbitt and Baumann, "Sewerage and Sewage Treatment," eighth edition, John Wiley and Sons, Inc., New York, 1958, page 449; Water Works and Sewerage, 81,358 (1938)). However, we have generally found that suitable concentrations of cationic or anionic latex of the type herein described, lie in the range of from about 0.1 to about 50 parts of latex per million parts of aqueous liquid to be treated, and quite generally in the range below about 10 parts of latex per million parts of aqueous liquor to be treated when the suspended matter is substantially organic. For substantially inorganic suspensions the preferred treating level is from about 20 to about 50 parts of cationic latex per 1000 parts of suspended matter. It will be appreciated by those skilled in the art that the ranges discussed in the above paragraphs are determined largely by economic practicability and that some degrees of reaction can be obtained over a wide range of conditions including conditions outside the above-described limits. For exceptionally high concentrations of suspended matter, either organic or inorganic, a greater dosage of latex of up to 1000 p.p.m. may advantageously be used.

The process of this invention is particularly adapted to the treatment of raw sewage. Sewage ordinarily is a dilute aqueous mixture of the wastes from households and industry that it is convenient and economical to carry away by water. As used in this specification and in the appended claims, the term sewage refers to any of the ordinary types of aqueous liquors containing significant amounts of wastes, such as fecal matter, domestic wastes, industrial wastes and such like, and is not to be construed as being limited to meaning only aqueous liquors which in lay terms are ordinarily called sewages, nor should it be construed as being limited to mean aqueous liquors which have acutally been carried through pipe, conduit or sewers.

Treated sewage is intended to include the effluent from primary or secondary settling basins, trickling filters, high-rate aeration or activated sludge processes, contact aeration, sand filter and other like sewage treatment processes.

In the preferred embodiment of this invention, sewage is treated sequentially with both the anionic and cationic latices of the instant invention to thereby increase the efficiency of conventional sewage treatment processes. A conventional treatment of sewage generally entails the following stages:

(1) Primary settling of the raw sewage to effect the removal of a portion of the insoluble material present,
(2) Aerobic digestion of the primary settler effluent whereby bacteria assimilate a portion of the remaining suspended and dissolved organic matter still present and convert it into microbial cells,
(3) Clarification of the digester effluent wherein the microorganisms agglutinate to form a sludge which is removed from the treated water,
(4) Tertiary treatment wherein the dissolved solids content of the water is reduced preparatory to its reuse or discharge into suitable receiving surface water.

The effectiveness of the primary settling stage can be greatly increased by treatment of the raw sewage, after its admission to the settling tank, with an anionic synthetic organic latex. A substantially greater percentage of the suspended matter present precipitates out than if no anionic latex is added or than if the same amount of alum or of cationic latex is added. Treatment of the raw sewage in the primary settling stage with anionic latex also significantly increases the effectiveness of the subsequent bacterial digestion stage since less suspended matter is present which the bacteria must assimilate.

The amount of anionic latex that is suitably employed in carrying out this invention with respect to the primary settling of raw sewage is quite variable. A concentration of latex ranging from 0.1 to 10 parts per million parts of water is normally effective. It will be understood that greater concentrations can be used, if desired. However, a greater concentration is not necessary in most instances, and for purposes of economy is not preferred. A concentration within the range of 0.2 to 2.0 parts by weight per million parts by weight of water is particualrly preferred.

In the post digestion clarification stage the natural agglutination tendency of the bacterial cells present in the digester effluent can be significantly augmented by the addition of a cationic latex. Likewise, after separation of the water from the agglutinated cells and prior to tertiary treatment, the water may profitably be treated with a cationic latex to reduce its suspended solids content still further. A suitable treating level in these stages is from about 5 to about 50 parts of cationic latex per million parts of water.

The agglutinated bacterial cell precipitate frequently contains substantial amounts of water. It has also been found that a cationic latex is a useful adjunct in the dewatering of this bacterial sludge so as to reduce the quantity of material which must be discarded.

Where the suspended matter to be coagulated is predominantly inorganic, a cationic latex is preferably employed. Normally, from about 20 to about 50 p.p.m. of cationic latex per 1000 p.p.m. of suspended inorganic solids will suffice for the substantially complete coagulation and precipitation thereof.

In order to be satisfactory for use in conventional water clarification equipment, the floc produced from water containing suspended matter by treatment with a coagulant, should have the ability to settle from the water in a period of time of five minutes or less under conditions on normal jar testing using 1000 ml. samples of aqueous suspension in 1.5-liter beakers. Flocs which take longer than this to settle are not considered suitable from the standpoint of effectively utilizing conventional clarification equipment. While the period of time set above is considered as being standard for most of the water treatment industry, the flocs produced in accordance with the instant invention, however, are generally capable of settling in periods of time ranging from 30 seconds to about three minutes, based on jar test observations. The flocs produced in accordance with this invention are also less fragile; hence, they are less subject to breaking or flaking, such as is the case when prior art cogulants such as alum are used.

The terms "synthetic cationic organic latex" and synthetic anionic organic latex, as used herein, contemplate a water-based emulsion formed by the free radical induced emulsion polymerization of $C_2$ to $C_{30}$ olefins, $C_4$ to $C_{30}$ dienes, or halogen, ester or aryl substituted olefins or dienes of the above chain length or mixtures thereof with each other or with up to an equimolar amount of aliphatic dithiols in the presence of water and a cationic or anioinic organic emulsifying agent. Alternatively, a combination of emulsifying agents of the same type, i.e. a combination of cationic emulsifiers or a combination of anionic emulsifiers may be used. Likewise, in some instances an emulsifier combinaiton comprising a cationic or anionic emulsifier and a non-ionic emulsifier may advantageously be utilized. The only limitaton on the choice of monomer or comonomers from the above denominated group is that the resultant polymer or copolymer must be water insoluble.

Suitable olefins and substituted olefins include, for example, ethylene, propylene, butene, pentene, heptene, octene, decene, dodecene, heptadecene, eicosene, docosene, tricosene, styrene, vinyl chloride, methallyl acohol, ethyl and methyl acrylate and methacrylate, vinyl acetate, acrylamide, vinylidene chloride and isopropenyl toluene. Suitable dienes include butadiene, isoprene, dimethyl butadiene, cyclopentadiene, chloroprene and biallyl. The preparation and characteristics of a variety of such latex emulsions are described in "Synthetic Rubber," G. S. Whitley, ed., J. Wiley & Sons, N.Y., 1954, at 224 et seq. and in Sorenson & Cambell, "Preparative Methods of Polymer Chemistry," Interscience, N.Y., 1961.

Particularly preferred results are obtained when conjugated dienes or halogen-substituted conjugated dienes such as butadiene, chloroprene, cyclopentadiene, dimethyl butadiene and monomethyl butadiene (isoprene) are used to prepare the latex.

Additionally, the olefin, diene or mixture thereof may be copolymerized with up to 50% by weight of nitrogen-containing olefinic comonomer in the presence of a suitable emulsifying agent and water. Preferably 5 to 10 weight percent of the nitrogen-containing comonomer is used.

Illustrative examples of suitable nitrogen-containing comonomers include acrylonitrile, methacrylonitrile, vinylidene cyanide, N-vinylpyrrolidone, dimethylaminoethyl acrylate, olefinic amines of the formula

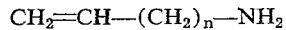

wherein $n$ ranges from 1 to 20, dimethylaminopropyl methyacrylamide, vinyl oxazolines and oxazines and $C_2$ to $C_{20}$ N-alkyl acrylamides, maleamides, maleimides and the like.

From about 1 g. to about 5 g. of water is preferably present per gram of olefin or diene being polymerized.

The polymerization may be effected at any temperature from about $-10°$ C. to $+80°$ C., depending upon the activation temperature of the particular catalyst selected.

Suitable free radical catalysts include, for example, peroxy compounds such as ammonium and alkali metal persulfates (peroxy disulfates), barium peroxide, hydrogen peroxide and organic peroxides such as tertiary butyl hydroperoxide, cumene hydroperoxide acetyl peroxide, t-butyl-isopropylbenzene hydroperoxide, and benzoyl peroxide, peracids such as peracetic acid and perbenzoic acid, uranyl acetate in the presence of light and the like. In addition, other non-peroxide free radical catalysts such as azobis-isobutyronitrile may be suitably employed. Normally, from about 0.05 g. to about 1.0 g. of catalyst is used per 100 g. of monomer.

Catalyst reactivity may be enhanced by the concomitant use of so-called modifiers or redox system additives such as hydroquinone, lactose, glucose, dihydroxyacetone, sodium hydrogen phosphate, sodium bisulfate, thiosulfate and metabisulfite, copper sulfate, ferrous ammonium sulfate, sodium pyrophosphate/ferric sulfate/cobalt chloride mixture and the like. Use of inorganic redox system additives is particularly desirable when the catalyst is substantially water insoluble. Under these circumstances the polymerization is carried out at a temperature below the activation temperature, in the absence of the redox additive, of the water insoluble catalyst which is in the organic monomer phase, thereby avoiding nonemulsion bulk polymerization of the organic monomer. Chain terminators such as dodecyl mercaptan may also be used to control the configuration and size of the polymer.

Any of a wide variety of known cationic and anionic organic emulsifying agents may be used to prepare the cationic and anionic latices, respectively, either alone or in combination with other emulsifiers of the same charge or with non-ionic emulsifiers, the more strongly ionic emulsifiers being preferred. The specific kind and quantity of emulsifying agent used will depend upon the nature of the monomer or monomers present and upon other characteristics of the reaction medium and conditions of polymerization. From about 2 g. to about 10 g. of emulsifying agent is generally used per 100 g. of monomer.

Illustrative examples of suitable cationic emulsifying agents are the quaternary salts derived from suitable inorganic or organic acids or inorganic acid salts and nitrogen-containing compounds such as: $C_{10}$ to $C_{30}$ primary fatty amines, di- to decaethoxylated $C_{10}$ to $C_{30}$ primary fatty amines, secondary and tertiary alkyl amines having a total of from 10 to 30 carbon atoms and ethoxy derivatives of such secondary amines having from 1 to 15 ethoxy groups, $C_{10}$ to $C_{30}$ fatty acid amides of 2-aminoethyl imidazoline, 2-$C_{10}$ to $C_{30}$ alkyl imidazolines and 1-hydroxyethyl imidazolines, trimethylated or triethylated $C_{10}$ to $C_{30}$ n-alkyl amines, dimethylated alkyl or aralkyl amines having a total of 1 to 30 carbon atoms, 1-amino or 1-hydroxylethyl-2-glyoxaline (imidazole) or $C_{10}$ to $C_{30}$ fatty acid amides or esters thereof, and $C_{10}$ to $C_{30}$ n-alkyl pyridines.

Suitable acids for interaction with the basic nitrogen compound include hydrochloric, hydrobromic, hydroiodic, sulfuric, sulfurous, benzene and toluene sulfonic, phosphoric, nitric, acetic, oxalic, propionic, tartaric, citric, sulfamic, glycolic, diglycolic and ethylenediaminetetracetic. Suitable acid salts include ammonium sulfate, sodium bisulfate, potassium bisulfate, methyl hydrogen sulfate and sodium acid phosphate.

Particularly preferred cationic emulsifying agents include the hydrochloride or acetate quaternary salts of $C_{10}$ to $C_{20}$ alkyl imidazolines, the hydrochloride or acetate quaternary salts of 1 to 15 times ethoxylated $C_{15}$ to $C_{25}$ primary amines, $C_{10}$ to $C_{20}$ n-alkyl trimethyl ammonium chlorides and the hydrochloride or acetate quaternary salts $C_{10}$ to $C_{20}$ primary amines.

Suitable anionic emulsifying agents include the ammonium and alkali metal salts of $C_{10}$ to $C_{30}$ primary and secondary alkyl sulfonates and sulfates, of $C_8$ to $C_{20}$ alkyl benzene sulfonates and $C_8$ to $C_{20}$ alkyl naphthalene sulfonates, of ethoxylated $C_{10}$ to $C_{30}$ aliphatic alcohol sulfates and of sulfates of ethoxylates $C_5$ to $C_{20}$ alkyl phenols. Particularly preferred anionic emulsifying agents are sodium lauryl sulfate and sodium dodecylbenzene sulfonate.

Suitable non-ionic emulsifiers include polyethoxylated alkyl phenols, alkylphenyl polyethyleneglycol ethers and the like.

The invention can be more fully understood by reference to the following examples. All parts are parts by weight unless otherwise expressly noted.

Examples 1–5 demonstrate the effectiveness of the cationic and anionic latices of the instant invention as coagulants for various types of aqueous suspensions.

Examples 6–19 describe the preparation of suitable anionic latices, while Examples 20–33 describe the preparation of suitable cationic latices.

Example 1

The effectiveness of the anionic latices of the instant invention in the treatment of raw sewage is shown below. The p.p.m. of suspended matter was reduced from 40% to 56% by the different latices shown.

The test was conducted by adding the latex to the raw sewage stirred at 100 r.p.m. As soon as addition was complete, the stirring rate was reduced to 30 r.p.m. and held there for 4 minutes and then further reduced to 10 r.p.m. for 5 minutes. The sewage was then filtered and the p.p.m. suspended matter remaining determined.

Example 2

The effectiveness of the cationic latices of the instant invention in the clarification of digester effluent is shown below.

The test was conducted by adding the latex to the digester effluent stirred at 100 r.p.m. As soon as addition was complete, the stirring rate was reduced to 60 r.p.m. and held there for 10 minutes, and then at 0 r.p.m. for a further 10 minutes. The effluent was then filtered and the turbidity determined.

Example 4

The cationic latices of the instant invention are effective as flocculants for raw water. A polybutadiene/ethoxylated stearylamine acetate latex was added to raw water containing about 500 p.p.m. of suspended soil and the mixture stirred for 10 minutes at 60 r.p.m., allowed to stand for 10 minutes and then filtered and the transmittance and turbidity determined. Results are tabulated below:

| P.p.m. latex added | Percent transmittance | Turbidity units |
|---|---|---|
| 0 | <10 | >350 |
| 5 | 53 | 173 |
| 10 | 68 | 125 |
| 20 | 87 | 48 |

EXAMPLE 1.—COAGULATION OF RAW SEWAGE WITH ANOINIC LATEX

| Polymer | Emulsifier | P.p.m. Latex | P.p.m. suspended matter before treatment | P.p.m. suspended matter after treatment | Percent reduction |
|---|---|---|---|---|---|
| Polybutadiene (Example 17) | Sodium lauryl sulfate | 0.2 | 188 | 82 | 56 |
| Polybutadiene (Example 18) | Sodium lauryl sulfate plus Na salt of ethoxylated nonylphenol sulfate | 0.2 | 44 | 26 | 41 |
| Do | do | 0.5 | 136 | 82 | 40 |
| Ethylene/vinyl chloride copolymer (Example 19) | Na dodecylbenzene sulfonate | 2.0 | 70 | 40 | 43 |
| Do | do | 5.0 | 70 | 38 | 45 |

EXAMPLE 2.—CLARIFICATION OF DIGESTER EFFLUENT WITH CATIONIC LATEX

| Polymer | Emulsifier | Conc. Latex in p.p.m. | Turbidity after treatment | Initial turbidity | Percent turbidity remaining |
|---|---|---|---|---|---|
| Alum | | 60 | 74 | 110 | 68 |
| Butadiene (Example 20) | 2x ethoxylated $C_{18}$ amine acetate | 25 | 41 | 114 | 35 |
| Butadiene/diethylaminoethyl acrylate (Example 32) | do | 21 | 49 | 114 | 43 |
| Butadiene (Example 20) | do | 10 | 42 | 114 | 37 |
| Ethylene/vinyl chloride (Example 33) | do | 20 | 55 | 129 | 43 |
| Butadiene (Example 20) | 1-hydroxyethyl-2-glyoxaladine hydrochloride | 25 | 70 | 110 | 64 |
| Do | 1-hydroxyethyl-2-laurylimidazoline hydrochloride | 25 | 96 | 110 | 87 |
| Do | 2x ethoxylated $C_{18}$ amine hydrochloride | 25 | 66 | 110 | 60 |
| Do | Lauryldimethylbenzyl ammonium chloride | 25 | 74 | 110 | 68 |
| Butadiene | Mixed alkylamine acetate | 20 | 26 | 114 | 23 |

Example 3

The effectiveness of the cationic latices of the instant invention in the treatment of inorganic suspensions is shown below. The latex was added to a 200 p.p.m. suspension of 200 mesh bentone (montmorillonite) in water stirred at 100 r.p.m. After addition was complete, the stirring rate was reduced to 60 r.p.m. for 10 minutes and then to 0 r.p.m. for 10 minutes after which the suspension was filtered and the percent light transmittance determined.

| Polymer | Emulsifier | P.p.m. latex | Percent transmittance |
|---|---|---|---|
| None | | | 84.7 |
| Diethylaminoethyl acrylate/butadiene (Example 32) | 2x ethoxylated $C_{18}$ amine acetate | 4.3 | 95 |
| Butadiene | Mixed alkylamine acetate | 5.0 | 96.5 |
| Butadiene (Example 20) | 2x ethoxylated $C_{18}$ amine acetate | 4.0 | 94.5 |
| Do | do | 5.0 | 96 |
| Do | 2x ethoxylated $C_{18}$ amine hydrochloride | 5.0 | 95 |
| Do | 1-aminoethyl glyoxaladine acetate | 5.0 | 93.5 |
| Do | Lauryldimethylbenzyl ammonium chloride | 5.0 | 92.5 |
| Do | 2-lauryl imidazoline acetate | 5.0 | 94.5 |

Example 5

The cationic latex of Example 4 was also found to be effective at dewatering bacterial sludge from the aerobic digestion stage of sewage treatment. 1000 ml. of digester sludge was run into a graduated cylinder and allowed to stand for 30 minutes. If no latex was added, the volume of settled solids after standing 30 minutes was 440 ml. If 15 p.p.m. of cationic latex was added, the settled solids volume was only 220 ml., a 50% reduction. The aqueous layer was decanted from the settled solids. In both cases this decanted water was of substantially equivalent purity.

Example 6.—Emulsion polymerization of styrene with persulfate

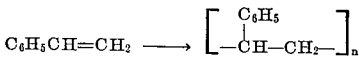

In a glass pressure vessel is placed 100 g. of water, 0.05 g. of potassium persulfate, 0.05 g. of sodium hydrogen phosphate and 1.0 g. of sodium laurylsulfate. When this mixture has become homogeneous, 50 g. of styrene is added. Nitrogen is bubbled through the mixture to displace the air and disperse the styrene. The vessel is then capped and sealed. It is maintained with intermittent agitation at 70° C. for 2 hours and then at 95° C. for an additional 2 hours. The product, a milky white free-flowing latex, is removed after cooling the reaction vessel to room temperature.

This latex is effective as a coagulant for inorganic and organic suspensions.

Example 7.—Emulsion polymerization of styrene with hydrogen peroxide

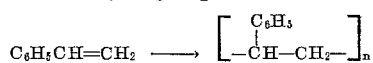

A mixture of 100 g. of styrene, 250 ml. of water, 1 g. of the sodium salt of diethoxylated nonylphenol sulfate and 0.2 g. of 30% hydrogen peroxide is stirred vigorously under nitrogen in a round-bottom flask. The mixture is heated for 12 hours at 80° C. An essentially quantitative yield of polymer latex product is obtained.

This latex is effective as a coagulant for inorganic and organic suspensions.

Example 8.—Emulsion polymerization of vinyl chloride with hydrogen peroxide

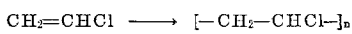

1 l. of distilled water, 50 g. of sodium dodecylbenzene sulfonate and 5.5 g. of 30% hydrogen peroxide is placed in a glass-lined stainless steel autoclave and cooled with Dry Ice. About 500 g. of vinyl chloride is now condensed into the reaction vessel from a cylinder. The mixture is then warmed to a temperature of between 40°–50° C. and maintained there for 20 hours. At this point polymerization is complete and the vessel is cooled to room temperature and the polymer latex product removed therefrom.

This latex is effective as a coagulant for inorganic and organic suspensions.

Example 9.—Emulsion polymerization of acrylonitrile

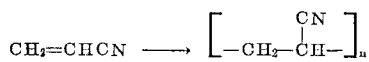

A 500 ml. 3-necked flask is fitted with a nitrogen inlet, a stirrer and a reflux condenser. The flask is placed in a bath maintained at about 35° C. and flushed for 15 min. with nitrogen. The 120 ml. of freshly boiled distilled water is added, stirring is started and the nitrogen flow is reduced to a very slow rate over the surface. To the flask is now added sequentially 2 g. of sodium laurylsufate, 80 g. of inhibitor-free acrylonitrile, 0.1 g. of potassium persulfate and 0.1033 g. of sodium bisulfite. Polymerization is complete within approximately 3 hrs. and a nearly quantitative yield of product is obtained as a stable dispersion. The particles are nearly spherical with a diameter of approximately 0.1μ.

This latex was effective as a coagulant for inorganic and organic suspensions.

Example 10.—Emulsion polymerization of vinyl acetate

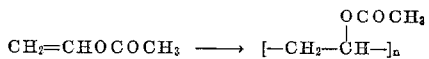

The polymerization is carried out in a 2 l. round-bottom flask equipped with a reflux condenser, mechanical stirrer, nitrogen inlet and thermometer. The charge consists of 200 g. of vinyl acetate purified by distillation 400 g. of water, 10 g. of potassium octadecylnaphthalene sulfonate, 0.5 g. benzoyl peroxide, 1.4 g. of ferrous ammonium sulfate hexahydrate and 6 g. of sodium pyrophosphate decahydrate. The flask is maintained at approximately 40° C., and the reaction mixture is blanketed with nitrogen. After approximately 1 hr. reaction is complete, and the latex product in substantially quantitative yield is removed from the flask.

This latex is effective as a coagulant for inorganic and organic suspensions.

Example 11.—Emulsion polymerization of styrene with peroxide

100 g. of styrene, 250 ml. of water and 0.2 g. of 30% hydrogen peroxide is stirred vigorously with 1 g. of sodium eicosyl sulfonate under nitrogen in a round bottom flask. After the mixture is substantially homogeneous, it is heated at 80° C. for 12 hours. An essentially quantitative yield of polymer latex product is formed.

This latex is effective as a coagulant for inorganic and organic suspensions.

Example 12.—Emulsion polymerization of vinylidene chloride

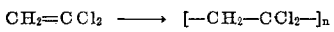

In a 1 l. 3-necked flask equipped with a nitrogen inlet, a condenser and a stirrer is placed 100 g. of vinylidene chloride, and 300 ml. of an aqueous solution containing 3 g. of ammonium persulfate, 1 g. of sodium hydroxide, 1.5 g. of sodium thiosulfate and 3 g. of sodium diethoxy eicosyl sulfate. The air in the reaction vessel is displaced with nitrogen, and the mixture is stirred for 6 hours at 30° C. At this time polymerization is essentially complete, and the polymer latex product is removed from the reaction vessel.

This latex is effective as a coagulant for inorganic and organic suspensions.

Example 13.—Emulsion copolymerization of acrylonitrile and isopropenyl toluene

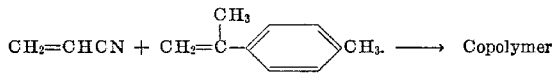

In a 3 l. 3-necked flask equipped with a condenser, stirrer and gas inlet is placed 450 g. of acrylonitrile and 150 g. of isopropenyl toluene. To this mixture is added 1200 ml. of water and 1.2 g. of benzoyl peroxide followed by 400 ml. of an aqueous solution containing 140 g. of sodium dodecylbenzene sulfonate. The polymerization mixture is agitated vigorously and heated in a steam bath for 14 hours with the interal temperature being maintained at 70° C. whereby a substantially quantitative yield of free-flowing latex is obtained.

This latex is effective as a coagulant for inorganic and organic suspensions.

Example 14.—Emulsion copolymerization of vinyl chloride and vinyl acetate

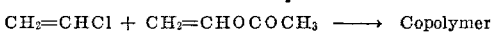

In a glass polymer tube is placed 100 ml. of water, 5 g. of sodium lauryl sulfonate, 0.25 g. of ammonium persulfate and 0.1 g. of sodium bisulfite. The mixture is cooled below the boiling point of vinyl chloride (−14° C.) with a Dry Ice acetone bath. Then 5 g. of vinyl acetate and 45 g. vinyl chloride measured by first condensing in a graduated vessel, are introduced into the polymer tube which is flushed with nitrogen and sealed. The tube is allowed to warm to 40° C. and agitated at this temperature for 2 hours. After cooling in ice water, it is opened and the polymer latex product removed.

This latex is effective as a coagulant for inorganic and organic suspensions.

Example 15.—Emulsion copolymerization of vinyl chloride and vinylidene chloride

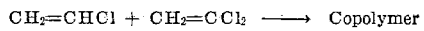

A mixture of 500 ml. of water, 4 g. of ammonium didecylnaphthalene sulfonate, 3 g. of 30% hydrogen peroxide and 0.5 g. of acid ammonium phosphate is mixed in a 1 l. stainless steel autoclave with 42 g. of vinylidene chloride and 126 g. of vinyl chloride measured from a pressure cylinder. The autoclave is then sealed and heated with agitation for 20 hours at 48° C. Polymerization is complete at the end of this period and the polymer latex product is removed after cooling to room temperature.

This latex is effective as a coagulant for inorganic and organic suspensions.

Example 16.—Emulsion polymerization of chloroprene

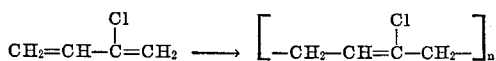

100 g. of freshly distilled chloroprene is emulsified in 150 ml. of water containing 5 g. of the sodium salt of diethoxylated nonylphenol sulfate, 0.8 g. of sodium hydroxide and 0.5 g. of potassium persulfate. Polymerization occurs at room temperature and may be followed by means of specific gravity changes. Polymerization may be considered complete when the specific gravity of the latex emulsion reaches between 1.068 and 1.070.

This latex is effective as a coagulant for inorganic and organic suspensions.

Example 17.—Emulsion polymerization of butadiene

Into a steel pressure vessel was placed 63 g. of water and 1.75 g. of sodium lauryl sulfate. The vessel and its contents were cooled to −20° C. and 25 g. of butadiene, 0.105 g. of potasium persulfate and 0.2 g. dodecyl marcaptan added. The system was purged of air by allowing 5 g. of butadiene to escape and then sealed. After 16 hrs. of agitation at 50° C., the vessel was vented and the polymer latex product removed.

This latex is effective as a coagulant for inorganic and organic suspensions.

Example 18

A mixture of 150 ml. of water, 2.5 g. of sodium lauryl sulfate and 2.5 g. of sodium ethoxylated nonylphenol sulfate were placed in a glass pressure vessel of 250 ml. capacity and cooled to −2° C. Then 65 g. of butadiene and 0.3 g. of potassium persulfate were added, and the system then purged by allowing 5 g. of butadiene to escape and sealed. After 16 hrs. of agitation at 50° C., the system was vented and the polymer latex product removed.

This latex is effective as a coagulant for inorganic and organic suspensions.

Example 19

Into a 1 l. stainless steel autoclave was placed 150 cc. of distilled water, 6.5 g. of sodium dodecylbenzene sulfonate and 1.0 g. of potassium persulfate and the autoclave then pressurized to 1600 p.s.i.g. with ethylene. Then vinyl chloride was added until the gas pressure reached 7500 p.s.i.g. The autoclave was agitated for 16 hrs at 50° C., after which is was cooled to room temperature, vented and the polymer latex product removed.

This latex is effective as a coagulant for inorganic and organic suspensions.

Example 20

This example illustrates the preparation of a butadiene polymeric cationic latex.

A mixture of 180 g. distilled water, 0.3 g. potassium persulfate ($K_2S_2O_8$) catalyst and 4.5 g. of diethoxylated stearyl amine acetate emulsifier was mixed in a stainless steel reactor and frozen. Then 85 g. of 1,3-butadiene was added. The reactor was sealed and heated to 50° C. and maintained at this temperature with agitation for 16 hours. On cooling to room temperature and venting, 244 g. of a free-flowing emulsion was obtained. Similar emulsions were prepared using butadiene and 1-hydroxyethyl-2-glyoxaladine hydrochloride, 1-hydroxyethyl-2-lauryl imidazoline hydrochloride, ethoxylated stearylamine hydrochloride, 2-lauryl imidazoline acetate, 1-aminoethyl-2-glyoxaladine acetate and lauryldimethylbenzyl ammonium chloride as emulsifiers.

These latices are effective as coagulants for inorganic and organic suspensions.

Example 21.—Preparation of poly(hexamethylene thioether) cationic latex

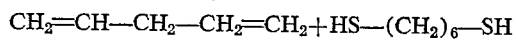

A mixture of 12.30 g. (0.0819 M) hexamethylenedithiol and 6.72 g. (0.0819 M) biallyl, both freshly distilled, is prepared and stored in a nitrogen-filled, 10 oz. screw cap bottle. 50 ml. distilled water and 1 g. of dodecyl imidazoline hydrochloride is added to the mixture of monomers, using a nitrogen line at the mouth of the bottle to keep air out. The bottle is capped and cooled to about 5° C. in an ice bath.

A catalyst solution is prepared no more than 5 hrs. before the polymerization from the following, using 2.5 ml. of each solution: 1.46 g. ammonium persulfate in 20 ml. distilled water; 0.37 g. sodium metabisulfite in 10 ml. distilled water; 0.37 g. copper sulfate (hydrate) in 100 ml. distilled water. The catalyst mixture is added, again using a nitrogen line for the exclusion of air, and the bottle is capped tightly and tumbled in a constant temperature bath maintained at 30° C. This may be accomplished by wiring the bottle very firmly to the end of a metal stirrer shaft which is then placed in the bath at an acute angle so that the bottle is turned mainly end-over-end. After 24 hours. the resultant emulsion is removed.

This latex is effective as a coagulant for inorganic and organic suspensions.

Example 22.—Emulsion polymerization of styrene with persulfate

In a soda pop or beer bottle is placed 100 g. of water, 0.05 g. of potassium persulfate, and 1.0 g. of monoethoxy dibutylamine acetate. When the mixture has dissolved, 50 g. of styrene is added. Nitrogen is bubbled through the mixture to replace the air and disperse the styrene. The nitrogen tube is removed and the bottle is capped and sealed. The bottle is wrapped with some wire screen (to prevent serious damage in the event the polymerization gets out of control) and maintained with intermittent agitation at 70° C. for 2 hrs., then at 95° C. for 2 hrs. After cooling to room temperature, the seal is broken and the bottle emptied affording a mobile emulsion.

This latex is effective as a coagulant for inorganic and organic suspensions.

Example 23.—Emulsion polymerization of vinyl chloride with persulfate

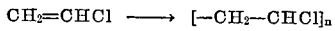

To a well-jacketed, glass lined autoclave (13.5 m.³ capacity) equipped with an agitator, 6000 l. of pure water, 100 l. of dodecylamine hydrobromide and 100 l. a 1% aqueous potassium persulfate solution is charged. The reaction vessel is sealed and evacuated, then 1800 l. of vinyl chloride is pumped in. Water is circulated in the jacket of the polymerization vessel and polymerization is allowed to proceed. Samples are withdrawn at regular intervals and the density of the polymer dispersion is measured. When the density reaches 1.024, and additional 380 l. of vinyl chloride is pumped in. The polymerization reaction is exothermic and great quantities of heat have to be dissipated through the walls of the polymerization vessel to the cooling medium in the jacket. In order to obtain better heat transfer once the polymerization begins, refrigerated brine is circulated in the cooling jacket at about −20° C. Very accurate control of the temperature of the reaction is necessary since the molecular weight is extremely sensitive to variation in temperature. High molecular weight material is obtained with internal temperature of 48–50° C. The emulsion product is free flowing.

This latex is effective as a coagulant for inorganic and organic suspensions.

Example 24.—Emulsion polymerization of acrylonitrile butadiene

A 500 ml. three-necked, round bottom flask is fitted with a nitrogen inlet, a stirrer and a reflux condenser.

The flask is thermostatically controlled in a bath at about 25° C. and flushed for 15 min. with nitrogen. Then 120 ml. of freshly boiled distilled water is added, stirring is started and the nitrogen flow is reduced to a very slow rate over the surface. To this flask is now added, in order, 2 g. of pentaethoxyeicosylamine hydrochloride, 20 g. of acrylonitrile freed of inhibitor, 60 g. of butadiene, 0.1 g. of potassium persulfate and 0.033 g. of sodium bisulfate. Evidence that the polymerization has started is the appearance of a milkiness, usually in about 5–20 min. If the milkiness does not appear within about 1 hr., an additional amount of persulfate initiator and bisulfate activator may be added. Once begun, polymerization is usually complete in 2–3 hrs. However, a small additional yield may be obtained by stirring it overnight. A nearly quantitative yield of polymer is obtained as a stable aqueous emulsion. The particles are nearly spherical with a diameter of approximately $0.1\mu$.

This latex is effective as a coagulant for inorganic and organic suspensions.

Example 25.—Emulsion polymerization of vinyl acetate

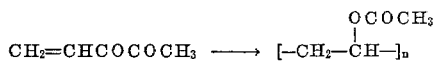

In a 2 l., round-bottomed flask equipped with a reflux condenser, mechanical stirrer, nitrogen inlet and thermometer is placed 200 g. of vinyl acetate purified by distillation, 400 g. of water, 10 g. of the acetate salt of myristyl imidazoline, 0.5 g. of benzoyl peroxide, and a redox system consisting of 1.4 g. of ferrous ammonium sulfate hexahydrate and 6.0 g. of sodium pyrophosphate decahydrate. The flask is thermostatically controlled at approximately 40° C. and the reaction mixture is blanketed with nitrogen. After approximately 1 hr. polymerization is complete affording a quantitative yield of a stable milky white latex.

This latex is effective as a coagulant for inorganic and organic suspensions.

Example 26.—Emulsion polymerization of methyl acrylate

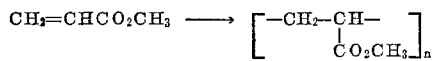

A three-necked flask is fitted with a stirrer, a reflux condenser and a thermometer. The flask is charged with 400 ml. of water, 20 g. of trimethyl dodecylamine hydrochloride and 1 g. of 30% hydrogen peroxide. The solution is stirred slowly and 200 g. of distilled methyl acrylate is added. Heat may be applied to the reaction vessel in order to initiate polymerization. If polymerization does not start within 10 min. after refluxing has occurred, additional hydrogen peroxide may be added. If excessive quantities are required, the monomer is not of sufficient purity. Once initiated, the polymerization usually proceeds at a rate sufficient to cause refluxing without external heating for 15–30 min. After about 30 min. heat is applied, and the refluxing temperature is allowed to rise until it is about 95° C., at which point the polymerization may be considered to be complete. The product is obtained quantitatively as a free-flowing emulsion.

This latex is effective as a coagulant for inorganic and organic suspensions.

Example 27.—Emulsion polymerization of vinylidene chloride

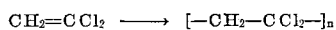

In a 1 l., three-necked flask equipped with a nitrogen inlet, a condenser and a stirrer is placed 100 g. of pure vinylidene chloride, 300 ml. of an aqueous solution containing 3 g. of ammonium persulfate and 3 g. of diethoxylated stearylamine acetate. The air in the reaction vessel is displaced by nitrogen and the temperature is maintained at 30° C. with stirring. After about 6 hrs. polymerization is essentially complete and a polymer emulsion is obtained.

This latex is effective as a coagulant for inorganic and organic suspensions.

Example 28.—Preparation of an emulsion of a copolymer of acrylonitrile and isopropenyl toluene

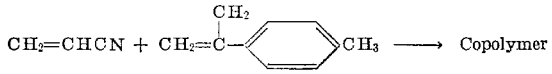

In a 3 l., three-necked flask equipped with a condenser, stirrer and a gas inlet is placed 150 g. of acrylonitrile and 450 g. of isopropenyl toluene. To this mixture of acrylonitrile and isopropenyl toluene is added 1200 ml. of water, 1.2 g. of benzoyl peroxide and 0.4 g. of sodium thiosulfate followed by 40 g. of triethyl myristyl amine hydrobromide.

The polymerization mixture is agitated vigorously and heated on the steam bath for about 14 hrs., internal temperature being maintained at about 40–42° C. The mixture is then steam distilled to eliminate any unreacted monomeric materials and in this manner 225–250 g. of polymer is obtained as an emulsion.

This latex is effective as a coagulant for inorganic and organic suspensions.

Example 29.—Preparation of a vinyl chloride-vinyl acetate copolymer

Copolymerization of vinyl acetate with vinyl chloride is carried out in the following manner.

In a glass polymer tube is placed 100 ml. of water, about 5 g. of monoethoxyeicosylamine hydrochloride, 0.3 g. of azobis-isobutyronitrile, 0.1 g. sodium pyrophosphate and 0.02 g. ferric sulfate. This mixture is cooled below the B.P. of vinyl chloride (−14° C.) with a Dry Ice acetone bath. 5 g. of vinyl acetate and 45 g. of vinyl chloride, measured by first condensing into a graduated vessel, are introduced into the pressure tube which is flushed with nitrogen and sealed. The pressure tube is allowed to warm to 40° C. and agitated for a period of 2 hrs. The vessel is now cooled in ordinary ice water and opened affording a quantitative yield of the copolymer as an emulsion.

This latex is effective as a coagulant for inorganic and organic suspensions.

Example 30.—Emulsion polymerization of chloroprene

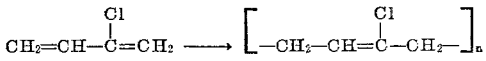

Emulsion polymerization of chloroprene is carried out according to the following procedure. 100 g. of freshly distilled chloroprene is added to 150 ml. of water containing 0.5 g. of cumene hydroperoxide, 0.1 g. sodium hydrogen phosphate and 10 g. eicosylamine acetate.

The mixture is heated to 80° C. and the progress of the polymerization is followed by means of specific gravity changes. The density of the emulsion increases with time and polymerization may be considered complete when the specific gravity of the emulsion is between 1.068 and 1.070. Any excess monomer is decanted.

This latex is effective as a coagulant for inorganic and organic suspensions.

Example 31.—Emulsion copolymerization of butadiene

A mixture of 4.2 g. of Arquad 12/50 (dodecyltrimethyl ammonium chloride), 150 ml. of water and 0.2 g. of potassium peroxydisulfate (persulfate, $K_2S_2O_8$) was placed in a pressure bottle and frozen. Then 75 g. of butadiene, 9.5 g. of N-vinylpyrrolidone, 0.07 g. of potassium metabisulfite (pyrosulfite, $K_2S_2O_5$) and 0.10 ml. of dodecyl mercaptan were added. 5 g. of butadiene was allowed to boil off to purge the bottle of air. The bottle was then sealed and agitated in a water bath, maintained at 30° C. for 16 hours, after which time the bottle was vented and the product removed as a milky-white free-flowing emulsion.

This latex is effective as a coagulant for inorganic and organic suspensions.

Example 32

The procedure of Example 31 was repeated with the exception that the emulsifying agent used was diethoxylated stearyl amine acetate and diethylaminoethyl acrylate was used as a comonomer instead of N-vinyl pyrrolidone. The latex product had the same appearance as that of Example 31 and was equally effective as a coagulant.

Example 33.—Ethylene/vinyl chloride emulsion copolymer 8.2 g. of Sipanol 1S2 (stearylamine ethoxylated with 2 mols of ethylene oxide) was transformed into its acetate salt with glacial acetic acid and dissolved in 50 cc. of distilled water. The aqueous solution was placed in a 1 l. steel autoclave and pressurized to 1400 p.s.i.g. with ethylene. Then 147 cc. of vinyl chloride, 5 cc. of a solution of 3.85 g. of ammonium persulfate dissolved in 490 cc. of water and 70 cc. of a solution of 4.9 g. of sodium metabisulfite dissolved in 490 cc. of water were added. Additional vinyl chloride was added until the gas pressure reached 8000 p.s.i.g. The autoclave was rocked for 5 hrs. with the temperature being maintained at 30° C. with sufficient vinyl chloride being added to maintain the pressure at 8000 p.s.i.g. throughout the course of the reaction. A total of 235 g. of the desired product emulsion were isolated.

This latex is effective as a coagulant for inorganic and organic suspensions.

Various modifications will be apparent to one skilled in the art, and it is not intended that this invention be limited to the details in the specific examples presented by way of illustration. Accordingly, the scope of the invention is limited only by the appended claims.

I claim:
1. A process for treating water containing suspended matter to remove a portion of said suspended matter comprising: (a) adding to an influent of said water a cationic or anionic synthetic organic latex flocculating agent, said latex being a water-based emulsion formed by the free radical-induced emulsion polymerization of $C_2$–$C_{30}$ olefins, $C_4$–$C_{30}$ dienes, or halogen-, ester- or aryl-substituted derivatives of said olefins or dienes, mixtures of said substituted or unsubstituted olefins or dienes with each other, mixtures of said substituted or unsubstituted olefins or dienes with up to an equimolar amount of an aliphatic dithiol, or mixtures of said substituted or unsubstituted olefins or dienes with up to 50 weight percent of nitrogen-containing olefinic monomer, in the presence of water and a cationic or anionic organic emulsifying agent, respectively; (b) permitting the concentration of a floc comprising said suspended matter and latex constituents into a substratum; and (c) separating said floc from said treated water.

2. A process in accordance with claim 1 wherein said flocculating agent is distributed substantially homogeneously throughout said water containing suspended matter.

3. A process in accordance with claim 1 wherein said separation is effected by decantation.

4. A process in accordance with claim 1 wherein said separation is effected by filtration.

5. A process in accordance with claim 1 wherein said water containing suspended matter is raw sewage.

6. A process in accordance with claim 5 wherein said latex is an anionic latex.

7. A process in accordance with claim 6 wherein said anionic latex is added in an amount of from about 0.1 to 20 parts per million parts of water.

8. A process in accordance with claim 1 wherein said water containing suspended matter is treated sewage and said latex is a cationic latex.

9. A process in accordance with claim 8 wherein said treated sewage is digester effluent.

10. A process in accordance with claim 8 wherein said cationic latex is added in an amount of from about 5 to about 50 parts per million parts of water.

11. A process in accordance with claim 1 wherein said suspended matter is substantially inorganic and said latex is a cationic latex.

12. A process in accordance with claim 11 wherein said cationic latex is added in an amount of from about 20 to about 50 parts of latex per 1000 p.p.m. of suspended matter.

13. A process in accordance with claim 1 wherein said latex comprises a polybutadiene and the sodium salt of a $C_{10}$ to $C_{30}$ alkyl sulfate.

14. A process in accordance with claim 1 wherein said latex comprises polybutadiene and the acetate salt of an ethoxylated $C_{10}$ to $C_{30}$ primary fatty amine.

References Cited

UNITED STATES PATENTS

| 3,142,638 | 7/1964 | Blaisdell et al. | 210—52 |
| 3,165,465 | 1/1965 | Ray et al. | 210—53 |
| 3,259,569 | 7/1966 | Priesing et al. | 210—53 X |
| 3,276,998 | 10/1966 | Green | 210—52 |

MICHAEL E. ROGERS, Primary Examiner

U.S. Cl. X.R.

260—29.6, 29.7